Figure 1:
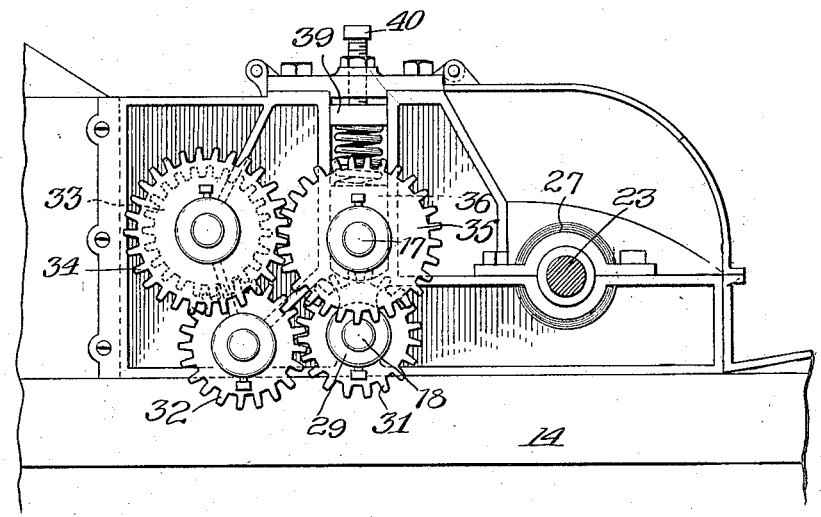

Nov. 20, 1923.

F. M. GOODHUE 1,474,901

TRANSMISSION MECHANISM

Filed June 15, 1923

7 Sheets-Sheet 1

Inventor:
Frank M. Goodhue,
By Dyrenforth, Lee, Chritton & Wiles,
Attys.

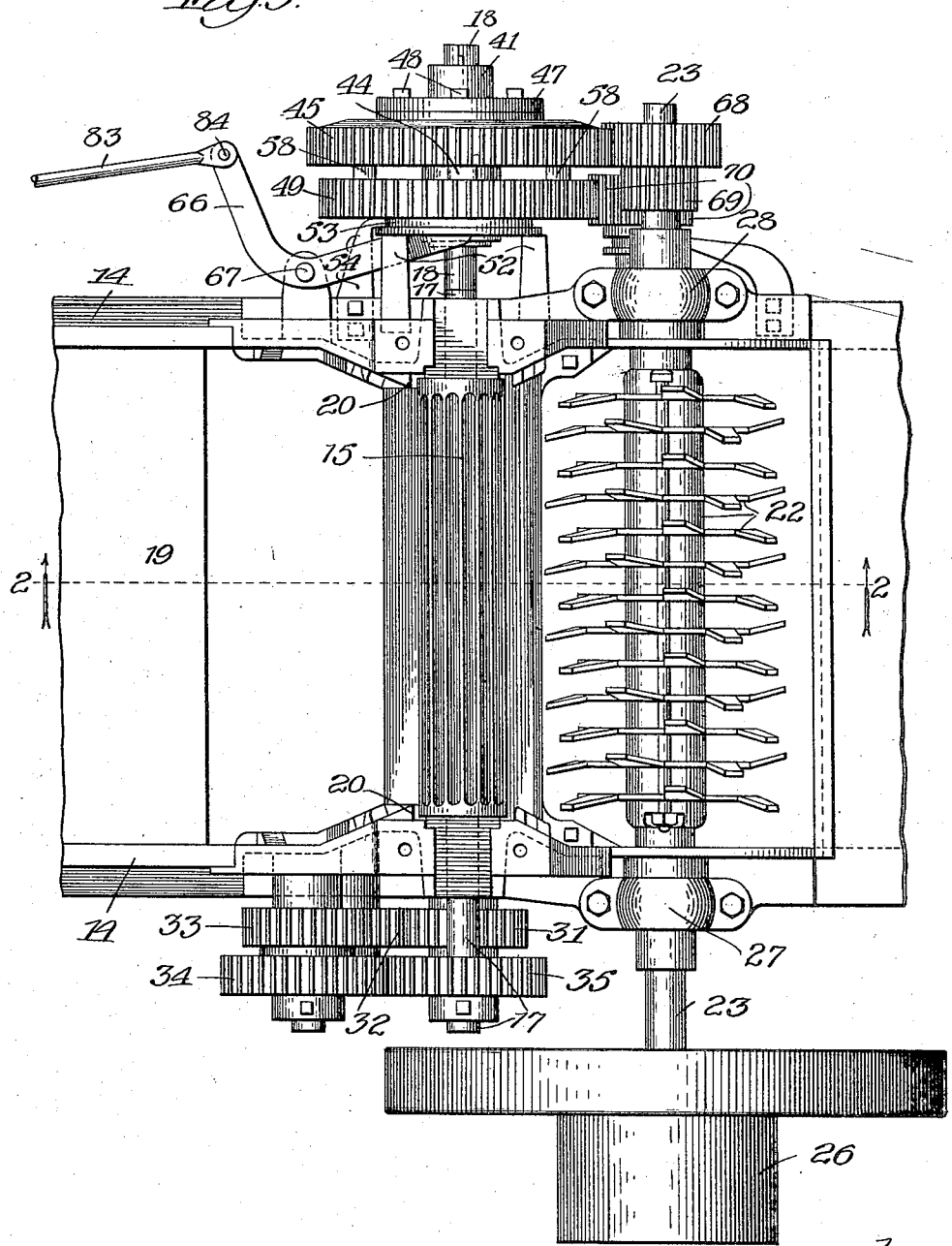

Nov. 20, 1923. 1,474,901
F. M. GOODHUE
TRANSMISSION MECHANISM
Filed June 15, 1923 7 Sheets-Sheet 4
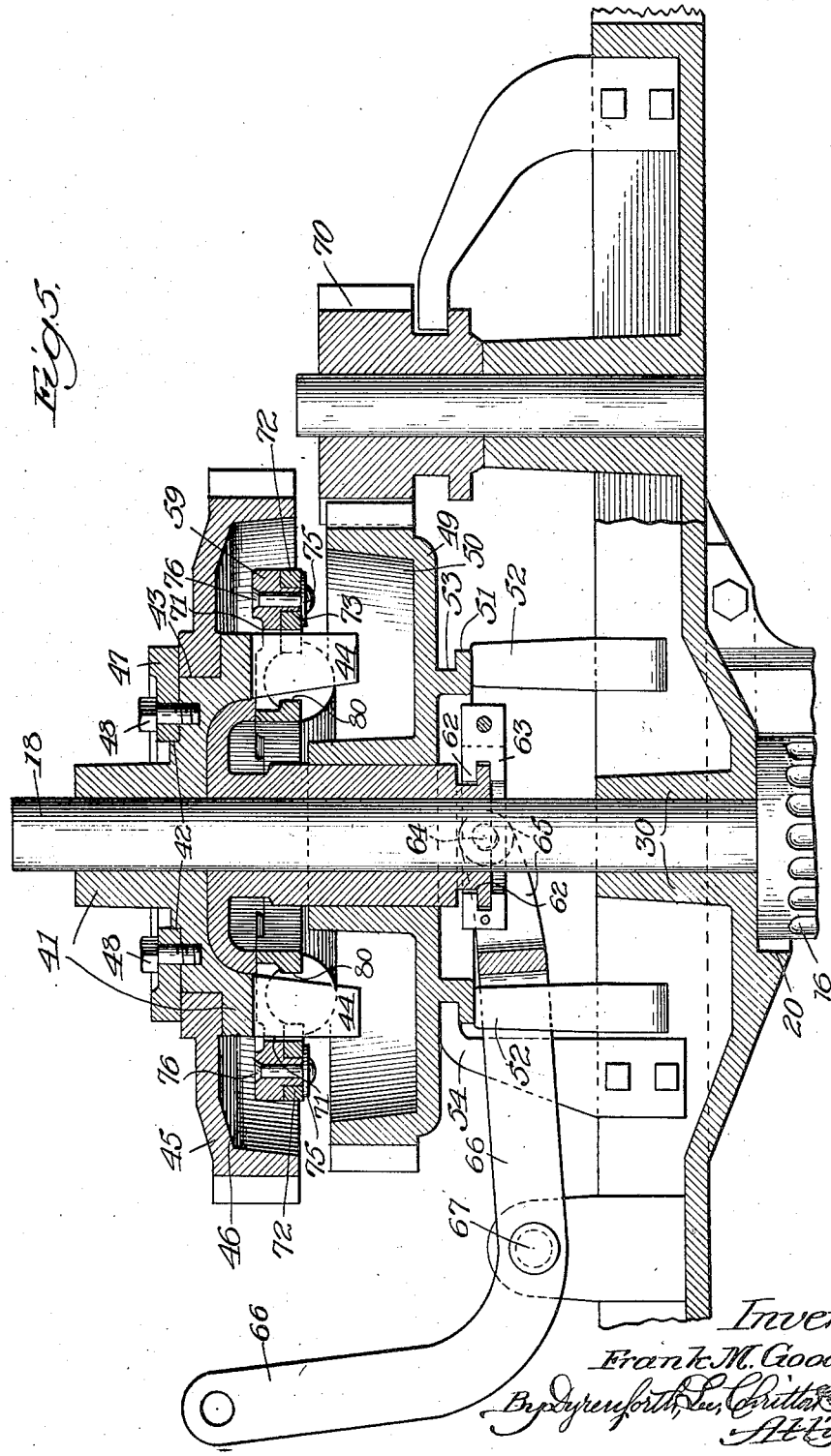

Nov. 20, 1923.  
F. M. GOODHUE  
1,474,901  
TRANSMISSION MECHANISM  
Filed June 15, 1923  
7 Sheets-Sheet 5
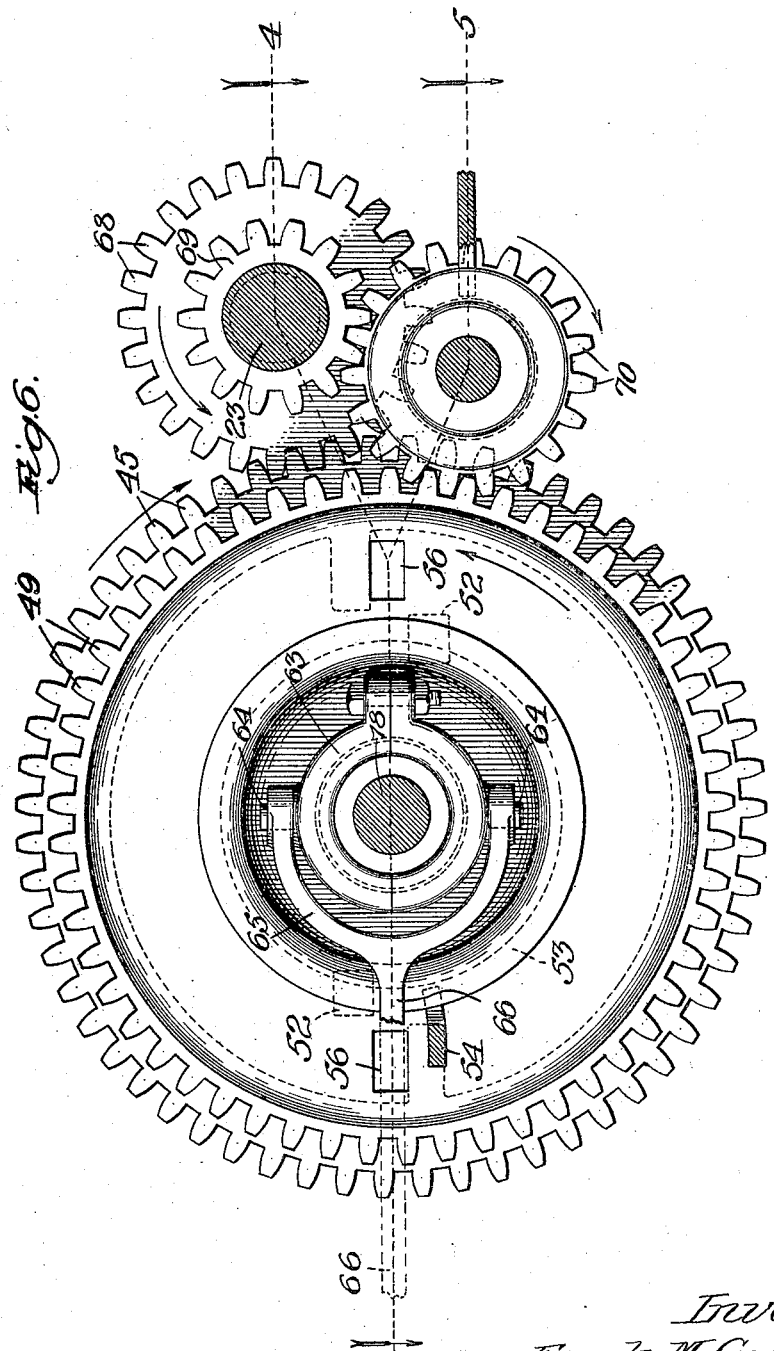
Inventor:  
Frank M. Goodhue,  
By Dyrenforth, Lee, Chritton & Wiles  
Att'ys Nov. 20, 1923.  
F. M. GOODHUE  
TRANSMISSION MECHANISM  
Filed June 15, 1923  
1,474,901  
7 Sheets-Sheet 6
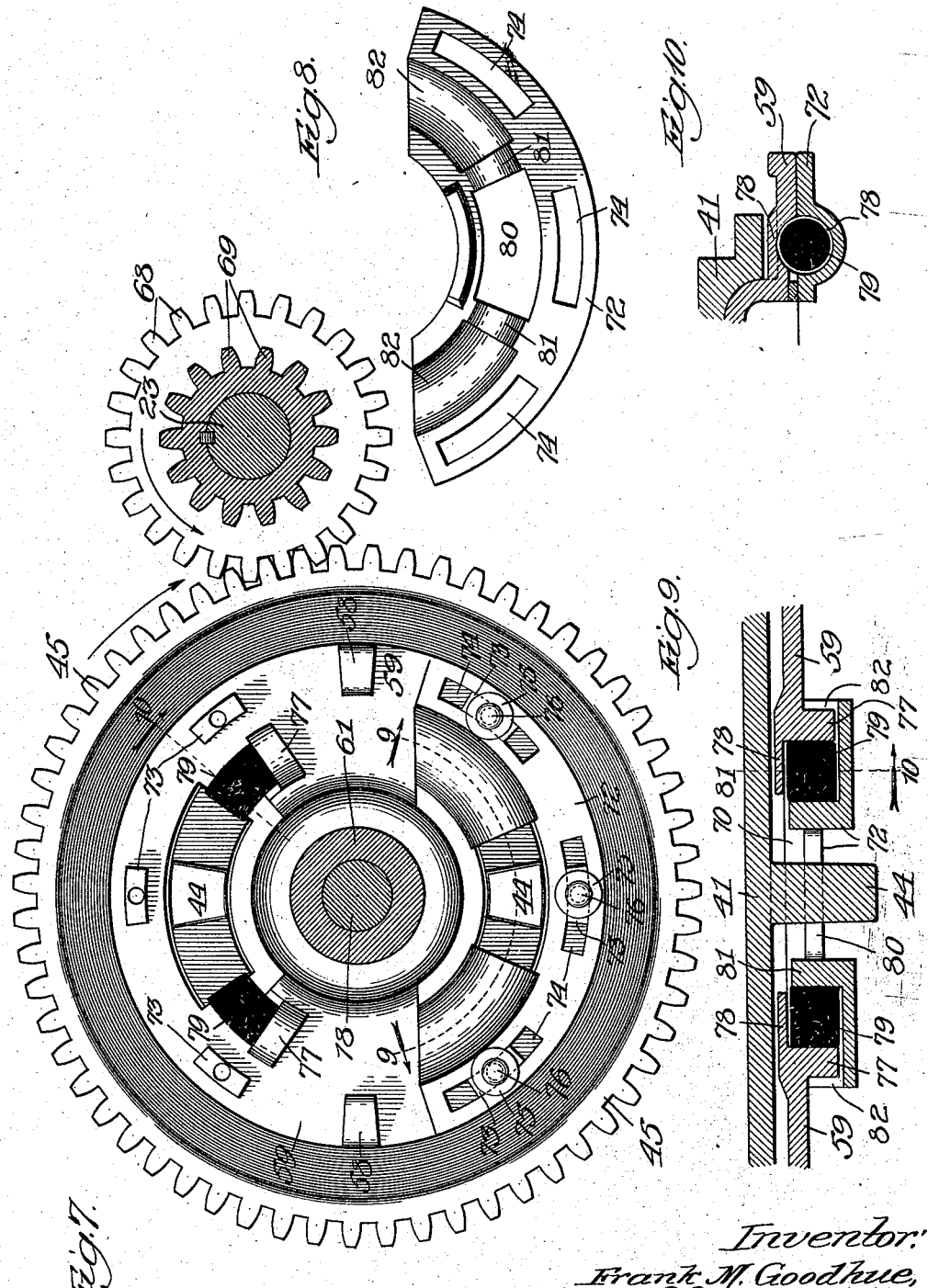

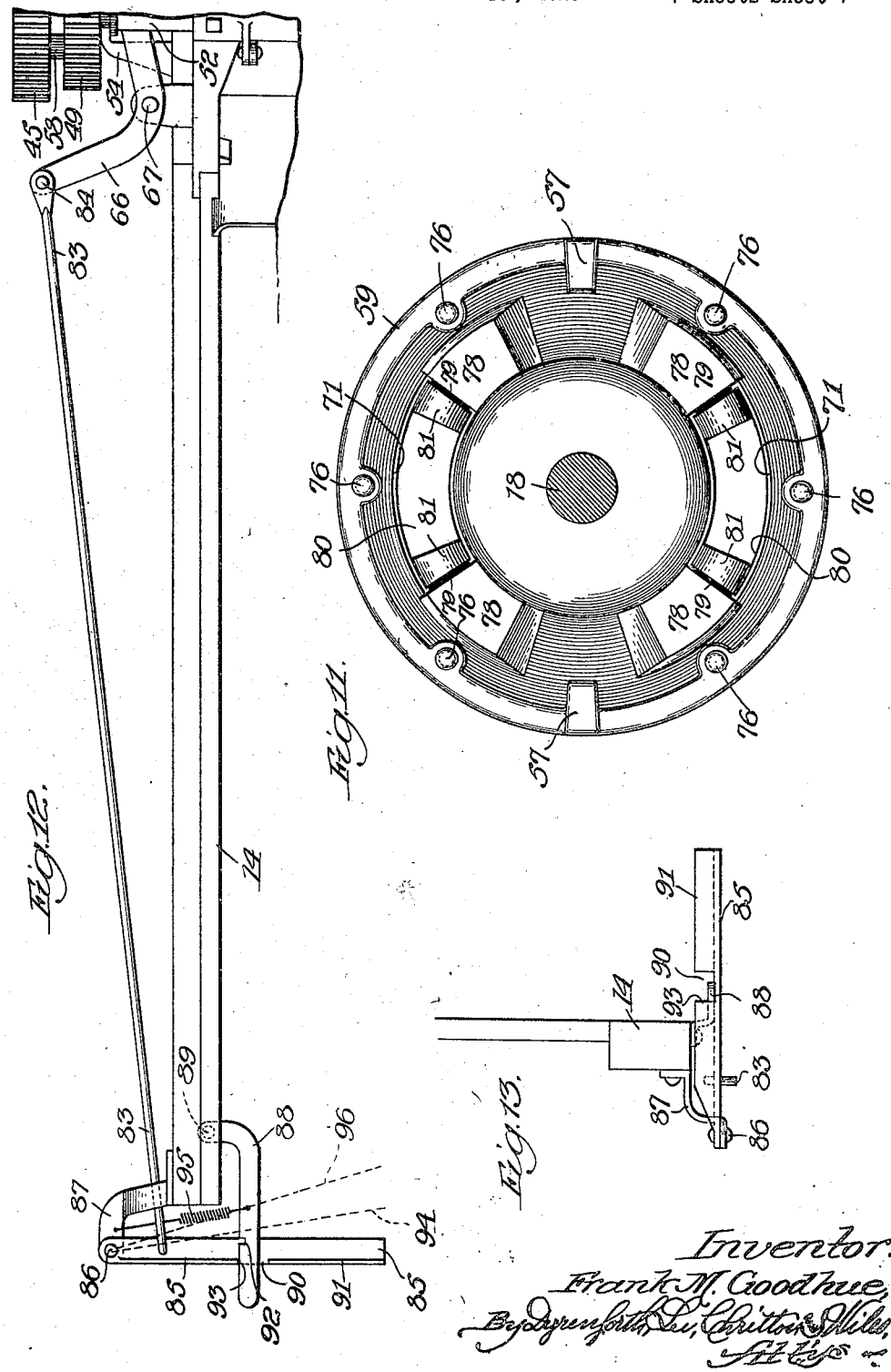

Patented Nov. 20, 1923.

1,474,901

UNITED STATES PATENT OFFICE.

FRANK M. GOODHUE, OF VAN NUYS, CALIFORNIA, ASSIGNOR OF ONE-HALF TO JAMES E. GOODHUE, OF ST. CHARLES, ILLINOIS.

TRANSMISSION MECHANISM.

Application filed June 15, 1923. Serial No. 645,582.

*To all whom it may concern:*

Be it known that I, FRANK M. GOODHUE, a citizen of the United States, residing at Van Nuys, in the county of Los Angeles and State of California, have invented a new and useful Improvement in Transmission Mechanism, of which the following is a specification.

My invention relates generally to transmission mechanism so constructed as to permit of the driving of a shaft in either direction, at will, and more particularly to transmission mechanism for driving a driven shaft presenting relatively great resistance to turning, particularly in the reversing of the rotation of the shaft.

I have devised my improved mechanism for use more particularly as the driving medium for the snapping rolls of a corn-husking machine, thought it is not limited to such use, this character of machine, an example of which is shown in United States Letters Patent No. 739,540, issued September 22, 1903, comprising a pair of snapping rolls located closely adjacent to each other, and in parallel relation, and driven simultaneously in opposite directions, respectively, and being formed with recesses in their peripheries, which are caused to register with each other in the rotation of the rolls and receive the ends of the stalks opposite those connected with the ears of corn, to insure the biting of the rolls against the stalks and the drawing of the latter through the rolls in the rotation of the latter, the snapping of the stalks from the ears being effected by the continuation of the drawing action against the stalks by the rolls, after the lower ends of the ears have moved into contact with the peripheries of the rolls. My main object, generally stated, is to provide a novel, simple and comparatively economical construction of transmission mechanism by which the element, driven through the medium of the transmission mechanism, may be rotated in either direction at will; to provide a construction whereby the driven shaft may be operated in either direction, without danger of impairing the parts of the construction even where the driven element presents relatively great resistance to turning in either direction; to provide a construction wherein the element, driven through the medium of the transmission mechanism, shall be free to continue its rotation in the direction in which it was being driven previous to the reversing of its direction of rotation, to the end that the driven element shall not receive the power for driving it reversely until after it has come to rest; and to provide a very compact construction of the general character above referred to.

In connection with the use of my improved transmission mechanism for driving the snapping rolls of corn huskers, it may be stated that inasmuch as the stalks are oftentimes very tough and difficult to snap from the ears, the snapping rolls frequently become clogged, requiring that the clogging material be removed therefrom, which operation, in accordance with common practice, presents very great inconveniences, and oftentimes results in the operator losing his hand, and, pursuant to the demand for a practicable reversing mechanism for reversely rotating the rolls to remove therefrom the clogging material, many attempts have been made to produce such a mechanism but without success due to the many difficulties presented in a machine of this character militating against the use of reversing transmission mechanism as commonly provided in other arts.

In this connection it is one of my objects to provide a reversing transmission mechanism which will be admirably adapted for use under the conditions presented in a machine of the character referred to and by which the operator may drive the snapping rolls in either direction as desired, reversing their rotation in the event that the machine becomes clogged, and without danger of impairing any of the parts of the structure.

Figure 2:
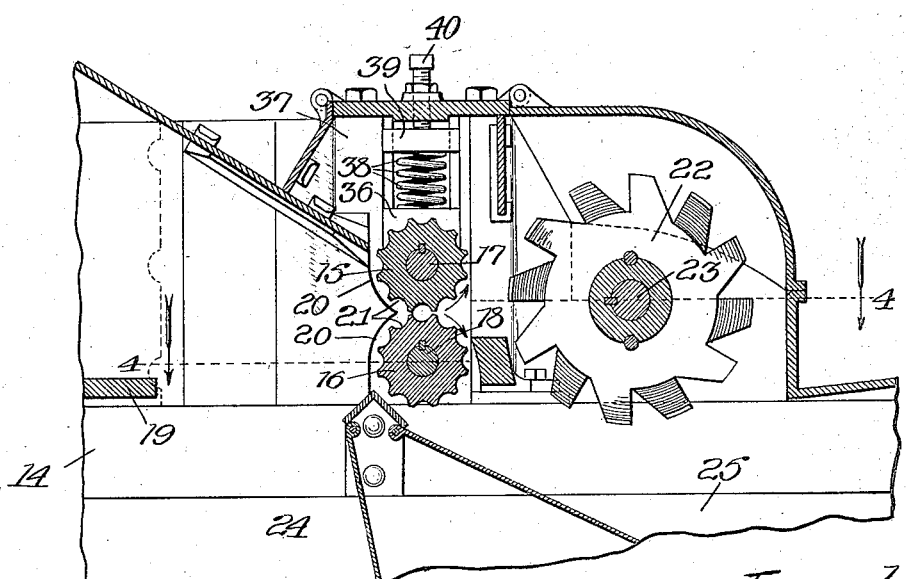

Referring to the accompanying drawings, in which I have shown my improvements as embodied in a corn-husking machine involving snapping rolls, as, for example, of the general type shown in said Letters Patent:

Figure 1 is a broken view in side elevation of that portion of the machine which is equipped with the snapping rolls and stalk-cutting mechanism, the main drive shaft, on which the cutting mechanism is mounted, being shown in section. Figure 2 is a view in longitudinal sectional elevation of that part of the machine shown in Fig. 1, the section being taken at the line 2—2 on Fig. 3 and viewed in the direction of the arrows. Figure 3 is a broken plan view of the part of the machine shown in Fig. 1. Figure 4 is an enlarged plan section taken at the irregular line 4—4 on Fig. 2 and viewed in the direction of the arrows and on line 4—X of Fig. 6 and viewed in the direction of the arrows. Figure 5 is a plan section taken at the line 5—X on Fig. 6 and viewed in the direction of the arrows, the sliding clutch-head and the one of the gears with which it is shown in clutched relation being shown as rotated one-fourth of a revolution from the position shown in Fig. 4. Figure 6 is a section taken at the irregular line 6—6 on Fig. 4 and viewed in the direction of the arrows. Figure 7 is a section taken at the irregular line 7—7 on Fig. 4 and viewed in the direction of the arrows, one of the sliding segmental plates forming a part of the clutch-head being removed. Figure 8 is an inside view of one of the two similar sliding segmental plates referred to. Figure 9 is a broken developed view taken at the line 9—9 on Fig. 7 and viewed in the direction of the arrows. Figure 10 is a broken sectional view taken at the line 10 on Fig. 9 and viewed in the direction of the arrow. Figure 11 is a view in elevation of the face of the clutch-head opposite to that shown in Fig. 7. Figure 12 is a broken plan view of the lever mechanism controlling the operation of the sliding clutch head; and Figure 13, an end view of the structure shown in Fig. 12, the structure being viewed from the left hand side of this figure.

The frame of the husking machine is represented generally at 14 and may be constructed in any suitable manner, as, for example, as shown in the Letters Patent above referred to, this frame supporting the upper and lower snapping rolls 15 and 16, respectively, which extend crosswise of the machine and are mounted on shafts 17 and 18, respectively. In front of the snapping rolls is the support 19 upon which the stalks, with the ears of corn attached, are positioned and along which they are fed to force the ends of the stalks, opposite those carrying the ears, into a position in which they enter the recesses 21 in the peripheries of the snapping rolls, the members 20 serving as guides for the stalks, and are thereupon fed by these rolls to the right in Fig. 2 and eventually broken off at the ears, and thereupon passed to the stalk-cutting mechanism, represented generally at 22, which may be of any desirable construction such as that commonly provided, and mounted upon a shaft 23 through the medium of which it is driven, the ears of corn thus removed from the stalks dropping through the chute 24 and the stalks cut to pieces dropping through the chute 25. The shaft 23, which forms the main drive of the machine, and to this end is shown as provided with a pulley 26 through the medium of which it is rotated in any desirable manner, is journaled on the frame of the machine at bearings 27 and 28 thereon.

The shaft 18 carrying the lower snapping roll 16 is journaled adjacent its opposite ends in bearings 29 and 30 provided on the frame 14, this shaft carrying a pinion 31 meshing with a pinion 32 journaled on the stationary frame and meshing with a gear 33 likewise journaled on the frame and rigid with a larger gear 34 which meshes with a gear 35 fixed on the shaft 17, this shaft being journaled in boxes 36 mounted, to slide vertically, in guides 37 adjacent opposite ends of this shaft and yieldingly pressed downward by coil springs 38 interposed between these boxes and followers 39 mounted on the guides 37 and adjustable vertically through the medium of set-screws 40. The shaft 17, carrying the upper snapping roll 15, is thus adapted to yield upward, against the action of the springs 38, in the operation of the rolls upon the stalks, and the gear mechanism just described serves to maintain driving connection between the shafts 18 and 17 and insure the rotation of these shafts in opposite directions simultaneously, and practically at the same speed at all times regardless of the vertical movement of the shaft 17 while the snapping roll mechanism is operating.

The snapping rolls are driven by power applied to the lower shaft 18 from the drive shaft 23, through the medium of reversible transmission mechanism embodying my improvements, a description of this mechanism being as follows. Surrounding the shaft 18 at the end thereof opposite that provided with the gear 31, and rigidly secured to this shaft to rotate therewith, is a driving head 41 the outer face of which is stepped to provide the annular recesses 42 and 43, its opposite, inner, face being provided with inwardly-projecting diametrically-opposed lugs 44. Rotatably mounted on the driving head 41, at the annular recess 43, is a gear 45 the inner face of which is dished, as represented at 46, this gear being rotatably confined on the driving head by means of a ring 47 located in the recess 42 and rigidly secured to the head as by the screws 48. Surrounding the shaft 18 between the gear 45 and the frame of the machine, is a gear 49 the face of which, which opposes the gear 45, being dished, as represented at 50, this gear, which is rotatable relative to the shaft 18, being mounted on a portion of the sliding clutch-head hereinafter referred to and bearing, at a ring-extension 51 thereon; flatwise against the outer end portions of studs 52 secured to the frame of the machine and projecting outwardly therefrom, the ring 51 being shown as formed about its periphery with an annular groove 53 into which a finger 54 rigidly secured to the frame of the machine extends, this finger and the studs 52 serving to limit movement of the gear 49 lengthwise along the shaft 18, while permitting it to freely rotate. The web portions of the gears 45 and 49 contain diametrically-opposed openings 55 and 56, respectively, for receiving the driving lugs 57 and 58 which project laterally in opposite directions from the disk portion 59 of a sliding clutch 60 surrounding the shaft 18 and journaled to be capable of rotation thereon. The clutch-head 60 is adapted to be slid along the shaft 18 to enter its lugs 57 into the openings 55 or its lugs 58 into the openings 56, as desired, and is provided with a hub portion 61 which extends through the gear 49 and upon which the latter is journaled, the outer end of this hub, at which it extends beyond the gear last referred to, containing an annular groove 62 into which a clutch shifting ring 63 extends and at which these parts are interlocked together to provide for the shifting of the sliding clutch-head by the shifting of the ring 63 lengthwise of the shaft while permitting the clutch-head to rotate in this ring, the ring 63 being trunnioned, as represented at 64, in the bifurcated end 65 of a bell-crank lever 66 fulcrumed at 67 on the frame of the machine, the lever 66 extending through one of the spaces between the studs 52 and serving as the medium through which the sliding clutch head is shifted lengthwise of the shaft 18 to establish connection between this head and either of the gears 45 and 49 as desired.

In the particular construction shown the gear 45, which is constantly driven from the shaft 23 by a pinion 68 on this shaft and meshing with the gear 45, is the gear through the medium of which the snapping rolls are rotated in a direction for performing the snapping function, and the gear 49, which is driven from a pinion 69 on the shaft 23, through an idler gear 70, is the gear through the medium of which the snapping rolls are reversely rotated to free them of clogging material therein, these gears, which are selectively clutched to the sliding head 60 as hereinbefore described, operating to rotate the shaft 18 through the medium of the head 60 and the driving head 41. To this end, the lugs 44 of the driving head extend into diametrically-opposed slots 71 in the clutch-head disk 59. Inasmuch as it is desirable that the engagement of the studs 44 with the clutch-head be cushioned, preferably in the rotation of the clutch-head 60 in either direction, means are provided for this purpose, these means, in the particular construction shown, involving segmental plates 72 which fit flatwise, at their peripheral portions, against the inner face of the clutch disk 59, the latter being provided with a series of guide studs 73 which extend into elongated arcuate slots 74 in the segmental plates, these studs, which are provided with washers 75 shown as secured in position by rivets 76 and overlapping the outer face of the segmental plates 72, serving as guides for these plates while permitting the latter to shift in arcuate paths on the clutch disk 59. The inner face of the clutch disk 59 is provided with lugs 77 set back from the ends of the slots 71, and the face of this disk in front of these lugs, is recessed, as represented at 78, to form pockets in which rubber buffers 79 are seated. The segmental plates 72 slotted at 80, to register with the slots 71, but of less length than the latter, are formed with bosses 81 so disposed that when the plates 72 are positioned on the clutch plate 59, as shown, these bosses will be circumferentially in alinement with the lugs 77, the inner faces of the segmental plates from the bosses 81 to the extreme ends of these plates being recessed, as represented at 82, whereby when the segmental plates and clutch disk are assembled, the buffers 79 will extend into the recesses 82 and between the cooperating bosses 81 and the lugs 77. The engagement of the sliding clutch-head with the studs 44, is thus through the medium of the bosses 81, and the parts of the structure are so constructed and arranged, as shown, that the segmental plates 72 are free to rotate on the clutch disk 59, except as restrained by the cushioning buffers 79, in either direction of movement of these segmental plates. Thus when the clutch disk is rotated in a direction reverse to that in which it has been rotated, the driving force exerted against the clutch-head 41 is cushioned, thereby avoiding jar in the starting of the rotation of this shaft. It will also be noted that the slots 80 are elongated whereby in the reversal of the rotation of the clutch disk there will be a time interval between the driving of the clutch disk in a reverse direction to that in which it was previously rotated, sufficiently long to permit the shaft 18 to cease rotating before it is reversely rotated.

The mechanism shown, and hereinbefore referred to, for controlling the position of the sliding clutch head 60, comprises, in addition to the bell-crank 66 and the operative connections between the latter and the head 60, a link 83 pivotally connected at 84 with the end of the bell-crank opposite that connected with the ring 63 and pivotally connected at its opposite end with a lever 85 pivotally connected at 86 with a bracket 87 secured to the frame 14 of the machine.

A latch lever 88 pivotally connected at 89 with the frame 14, cooperates with the lever 85 for locking the latter in a position in which the clutch-head 60 is in neutral position, this latch lever, which extends through an opening 90 in a flange 91 of the lever 85 containing a notch 92 which receives the portion 93 of the flange and holds the lever 85 against movement in the neutral position of the lever 85 represented by the dotted line 94, a spring 95 connected with the bracket 87 and lever 88 yieldably forcing the latter into latching position.

The parts of the mechanism are represented in the positions they assume when the shafts 17 and 18 are being rotated in the direction of the respective arrows in Fig. 2, in which position the sliding clutch-head 60 is clutched to the gear 45. Upon shifting the lever 85 to the dotted line position 94 (Fig. 12), the sliding clutch head is in neutral position and the shafts 17 and 18 are at rest, the lever 85 being latched against movement by the lever 88; and upon shifting the lever 85 to the dotted line position 96 in this figure, the sliding head operatively engages the gear 49 for rotating the shafts 17 and 18 in directions opposite those indicated by the respective arrows in Fig. 2.

It will be understood from the foregoing, assuming the transmission mechanism to be incorporated in a machine, as above described, that should the snapping rolls become clogged with the stalks, requiring their removal, this may be readily automatically effected by merely reversing the rotation of the rolls 17 and 18 through the medium of the reversing control in the transmission and without undue jar or shock to the machine.

It will also be noted that by constructing a transmission mechanism in accordance with my invention, the same is rendered very compact inasmuch as the shifting of the sliding clutch-head is effected through the connections which are exterior of the gears on the driven shaft.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

1. In transmission mechanism, the combination of a drive shaft, a driven shaft, gears rotatable relative to said driven shaft and driven from said drive shaft in opposite directions, and means whereby said gears may be alternately engaged with said driven shaft involving a member fixed on said driven shaft and a second member slidable along said driven shaft and in driving engagement with said first-referred-to member and adapted to be moved into engagement with either of said gears.

2. In transmission mechanism, the combination of a drive shaft, a driven shaft, gears rotatable relative to said driven shaft and driven from said drive shaft in opposite directions, and means whereby said gears may be alternately engaged with said driven shaft involving a member fixed on said driven shaft and a second member slidable along said driven shaft and in driving engagement with said first-referred-to member and adapted to be moved into engagement with either of said gears, one of said gears being rotatably mounted on said first-referred-to member.

3. In transmission mechanism, the combination of a drive shaft, a driven shaft, gears rotatable relative to said driven shaft and driven from said drive shaft in opposite directions, and means whereby said gears may be alternately engaged with said driven shaft involving a member fixed on said driven shaft and a second member slidable along said driven shaft and in driving engagement with said first-referred-to member and adapted to be moved into engagement with either of said gears, said members being relatively rotatable to a limited degree.

4. In transmission mechanism, the combination of a drive shaft, a driven shaft, gears rotatable relative to said driven shaft and driven from said drive shaft in opposite directions, and means whereby said gears may be alternately engaged with said driven shaft involving a member fixed on said driven shaft and a second member slidable along said driven shaft and in driving engagement with said first-referred-to member and adapted to be moved into engagement with either of said gears, and cushioning means between said members, for the purpose set forth.

5. In transmission mechanism, the combination of a drive shaft, a driven shaft, gears rotatable relative to said driven shaft and driven from said drive shaft in opposite directions, and means whereby said gears may be alternately engaged with said driven shaft involving a member fixed on said driven shaft and a second member slidable along said driven shaft and in driving engagement with said first-referred-to member and adapted to be moved into engagement with either of said gears, and cushioning means between said members, for the purpose set forth, said members being rotatable relative to each other to a limited degree.

6. In transmission mechanism, the combination of a drive shaft, a driven shaft, gears rotatable relative to said driven shaft and driven from said drive shaft in opposite directions, and means whereby said gears may be alternately engaged with said driven shaft involving a member fixed on said driven shaft and having a projection, and a second member slidable along said driven shaft and having a part in driving engagement with said projection and adapted to be moved into engagement with either of said gears.

7. In transmission mechanism, the combination of a drive shaft, a driven shaft, gears rotatable relative to said driven shaft and driven from said drive shaft in opposite directions, and means whereby said gears may be alternately engaged with said driven shaft involving a member fixed on said driven shaft and a second member slidable along said driven shaft and formed of relatively movable sections with one of which said first-named member engages, and cushioning means between said sections.

8. In transmission mechanism, the combination of a drive shaft, a driven shaft, gears rotatable relative to said driven shaft and driven from said drive shaft in opposite directions, a driving head rotatable with said driven shaft and on which one of said gears is rotatably mounted, said driving head being provided with a projection, a sliding clutch-head mounted on said driven shaft and located between said gears, said clutch-head being adapted to alternately operatively engage said gears and be driven by the latter and having a sleeve portion upon which the other of said gears is rotatably mounted, and means engaging said sleeve for moving said clutch-head along said driven shaft, said clutch-head being formed of a disc at which it operatively engages said gears as stated and with a section movable on said head and with which said projection on the driving head engages, and cushioning means interposed between said disc and section.

FRANK M. GOODHUE.